S. C. MYERS.
Bee Hive.
No. 1,255.
Patented July 22, 1839.
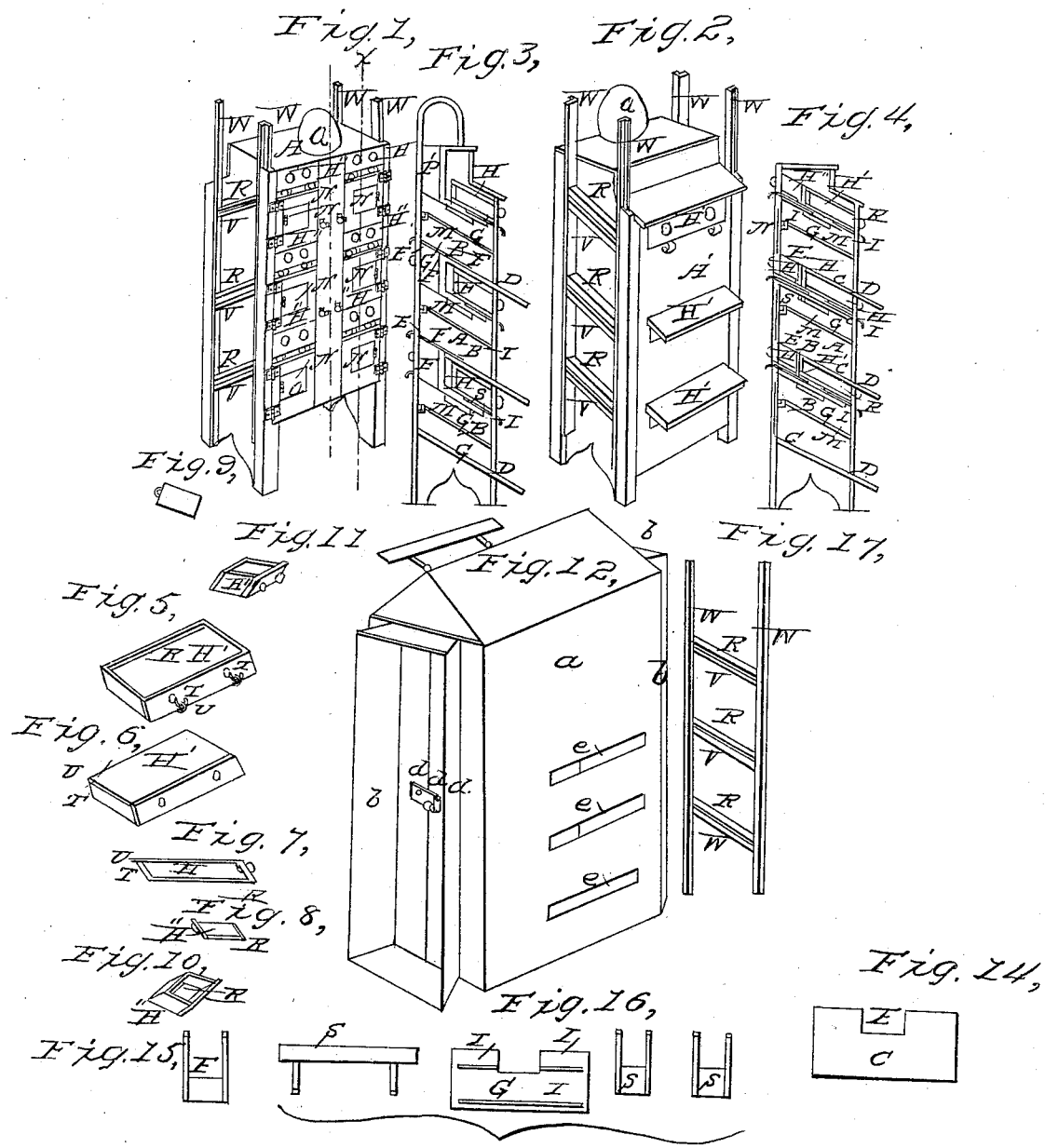

UNITED STATES PATENT OFFICE.

SAMUEL C. MYERS, OF MOUNT PLEASANT, PENNSYLVANIA.

BEEHIVE.

Specification of Letters Patent No. 1,255, dated July 22, 1839.

*To all whom it may concern:*

Be it known that I, SAMUEL C. MYERS, of Mount Pleasant, Westmoreland county, and State of Pennsylvania, have invented a new and useful Improvement in the Construction of Beehives, which is described as follows, reference being had to the annexed drawings of the same, making part of this specification.

Figure 1, is a perspective view of the bee hive showing the back, one end, and the top. Fig. 2 is a perspective view of the front. Fig. 3 is a vertical cross section through the line X—X of Fig. 1. Fig. 4 is a vertical cross section through the line O O, of Fig. 1. Fig. 5 one of the large drawers, bottom up. Fig. 6 ditto, top up and the movable shutter in its proper place; Fig. 7 cross section of ditto; Fig. 8 cross section of one of the small drawers; Fig. 9 lid detached; Fig. 10 perspective view of one of the small drawers; Fig. 11 the other small drawer; Fig. 12, one of the long slides S; Fig. 13, outer house or case; Fig. 14, plan of one of the floors showing the opening therein; Fig. 15, slide for closing opening in the floor of each room; Fig. 16, one of the ceilings showing the four openings therein for the bees to pass through and slides S; Fig. 17, slides for closing openings in the end of the bee-house.

Similar letters of reference, refer to similar parts in the several figures.

This bee hive consists of a rectangular box or house A, about four feet long, two feet wide, and six feet high, having a flat top or roof, and an inclined bottom which is also the lower floor, with openings in the front for the bees to enter the house, to admit certain drawers and slides, also openings in the back to admit other drawers and slides, and openings for gaining access to the house, closed by doors and an opening in the top (covered by the scape) through which the bees enter the bee house.

The bee house as here represented is divided into three rooms B, B, B, for the bees to deposit their honey in, the floors C of which are placed at an angle of about forty-five degrees in order to discharge through the opening D in front any worms that may fall upon them, said floors extending the whole length of the room and projecting through said openings D in front through which openings the bees also enter and leave the house, the floor being extended beyond the front about six inches forming a ledge for the bees to light on; and in each floor at the back, in the center, there is an opening E for the bees to pass through from one room to another, closed by a slide E, Fig. 15, when required to remove the honey. The opening is seen more clearly at E, Fig. 14.

Above each room is formed an inclined ceiling G, Figs. 3, 4, and 16, placed at the distance of about six inches from the floors and the roof, forming spaces between said roof and ceiling and between the ceilings and floors in each of which are inserted three drawers H', H'', H''', one large and two small ones (the large drawer is marked H' and the small ones H'', H''',) in which the bees deposit their honey.

In each ceiling G there are three oblong openings I made under openings K in the bottoms of the drawers through which the bees pass from the rooms into the drawers—the openings in the drawers being smaller than those in the ceiling. These openings are closed by tin slides S moving between the bottom of the drawers and the upper side of the ceiling,—their handles passing through openings in the back and front of the house and extending sufficiently far to form handles to lay hold of—there being one slide for each opening.

The front, back, and ends of each box, when inserted in its proper place, stand in a perpendicular position, the figures of the bottom, lid, and ends is rectangular,—the sides rhomboidal—the top and bottom of the boxes are placed at the same inclination as the floors, the lid is movable and rests against the front of the box which projects above the ends far enough to form a jog for its support, two handles are inserted into the front of each box by which it is moved. The drawers in front are made the length of the room. Those at the back are about one third the length of those in front.

The communication from one room to another is had through trunks P constructed between the ceilings and floors around the openings E which communication is opened or closed by the slide F, Fig. 15.

To the back of each drawer are attached hooks T, which hook into eyes U in the edge of the lid. The lids are made movable for the purpose of facilitating the discharge of the honey, which is done by unhooking the hooks and passing an extended wire through the honey combs between the drawer and the under side of the lid, and it being thus separated the lid is easily removed, leaving the honey completely exposed.

Each drawer should be provided with a lock and key and be kept locked. Should the drawers be deeper than six inches they must be provided with cross sticks placed about six inches apart to support the honey-combs. The rooms are also provided with cross sticks M inclined with the floor and set corner up and resting with their lower ends in holes in the inside of the front of the room and their upper ends on a cross stick at the back.

Each room is provided with two hinged doors N through which the honey is removed from the rooms and are generally locked; and each has a pane of glass on the inside thereof through which the operations of the bees may be seen, and the state of the rooms examined whenever required, and are covered by hinged shutters O at other times; said shutters should also be kept locked. Through the roof is made an opening surrounded underneath by a trunk P′ leading through the upper ceiling to the upper room, over which opening in the roof is to be placed the bee scape Q and through the trunk the bees are conducted to the upper rooms.

Openings are made through the ends of the house opposite each room immediately under the ceiling which are opened or closed by inclined slides R composed of pieces of wood attached to two vertical parallel pieces or slides tongued and moving vertically in grooves formed in the corner posts of the ends of the bee house. Below each opening on the outside is nailed an inclined piece of wood V of the same thickness as the slide and upon which it rests when brought down. The parallel sides of the slide extend above the top of the house and serve as handles W to raise or lower it by. These openings are for the purpose of affording a passage from this house into another when it is desired to prevent the bees from swarming.

In the use of this improved bee house the first thing to be done is to insert the drawers, remove the slides from over the openings, arrange the comb-sticks, and lock the doors. Then place the bee scape over the openings in the roof from which the bees descend into the upper rooms and form their combs; they will then ascend again through the openings in the ceiling into the drawers and there form combs likewise. The scape may then be removed and the opening closed. The bees will continue to work downward until they get into lower room, passing through the several ceilings into the drawers. When this house is filled prepare two other houses of a similar form and construction and screw them to the one above described, then raise the slides which will open communications from one to another.

When the last mentioned houses are half filled remove them and put others in their places:—by this means the bees will be prevented from swarming. Whenever it is desired to collect the honey in small quantities, during the summer season, a slide under one of the back drawers must be drawn over the opening in the ceiling under said drawer. This drawer may then be removed and the honey discharged in the manner described. All the hind drawers may be treated in a similar manner. The front drawers are to be removed for a similar purpose in the autumn, when the weather is warm.

In order to remove the honey from the lower rooms the bees must be driven by smoke (admitted through the entrances) to the rooms above. The slides above the floor must then be drawn over the openings in the floors to prevent their return. The doors in the back are then opened and the honey removed.

In very warm weather, after harvest, when it is required to keep the bees cool and to cause them to work more briskly it is proposed to make use of an additional house, Fig. 13, of greater dimensions than the bee house, and which is to be placed over the latter, leaving a space of about three feet between the outside of the bee house A and the inside of the additional house, a Fig. 13 at the back and five feet at the sides—its ends b being made flaring to gather in the air and furnished with doors a′ to regulate the draft—which doors are to be left open, after harvest, and kept closed during the winter and the fore part of the summer. The ledge of the inclined floors of the bee house extend through openings e in one side of this additional house for the bees to light upon.

It is not intended to confine the construction of the houses to the size and proportion above mentioned, but to vary them as circumstances may require.

The invention claimed and desired to be secured by Letters Patent consists,—

1. In the arrangement of the drawers, ceilings, and slides in combination with the rooms, glazed doors, and trunk as before described.

2. The additional house covering the bee house for keeping the bees warm in winter, and cool in summer.

3. The vertical slides at the ends of the bee house.

4. The trunks leading from one room to the other, all in combination as before described.

SAMUEL C. MYERS.

Witnesses:
  WM. P. ELLIOT,
  WM. BISHOP.